March 15, 1960 — L. N. NEUFELD — 2,928,097
UNDERWATER GOGGLES
Filed Oct. 15, 1956
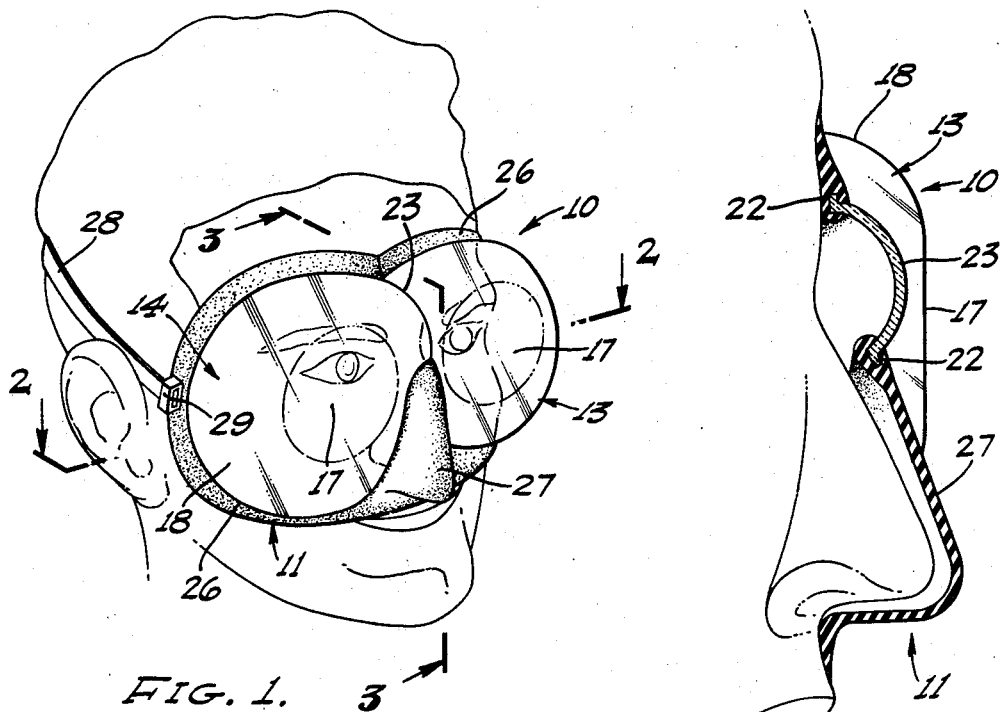
FIG. 1.
FIG. 3.
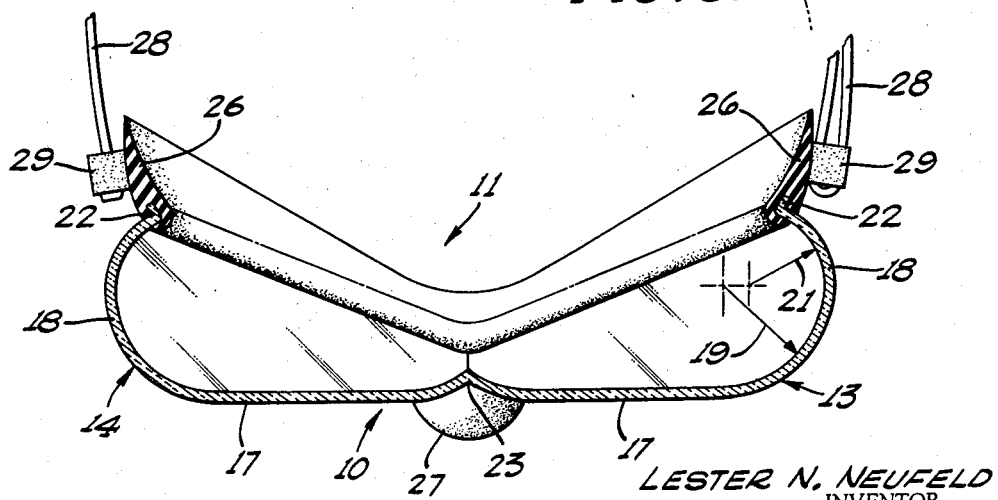
FIG. 2.
LESTER N. NEUFELD
INVENTOR.
BY
ATTORNEY

United States Patent Office 2,928,097
Patented Mar. 15, 1960

2,928,097

UNDERWATER GOGGLES

Lester N. Neufeld, Corona Del Mar, Calif.

Application October 15, 1956, Serial No. 615,978

6 Claims. (Cl. 2—14)

This invention relates to underwater goggles, and more particularly to goggles adapted to be worn during skin diving and spearfishing.

Present day skin divers conventionally use a face mask comprising a glass or plastic disc mounted in a relatively large diameter rubber cylinder, one end of the latter being contoured to fit the face. While masks of the type indicated have the advantage that they cover both the eyes and nose of the wearer, so that water is prevented from entering the nose and so that the wearer may equalize pressures within the mask as he dives into deeper water, such masks have the very great disadvantage that side vision is all but eliminated. Side vision is extremely important to the skin diver since he should be able to discern objects, particularly those in motion, over a wide angle and without having to continuously crane his neck in all directions.

Because of the above defects in face masks, and for other reasons, may skin divers have employed goggles instead of masks. Conventional goggles, however, have not increased side vision substantially, by comparison to face masks, and many goggles have had the very serious defect that forward or front vision is distorted. Furthermore, conventional manufactured goggles press excessively into the eyes and face of the user when he dives into deep water, this being due to the fact that it is impossible, with such goggles, to equalize pressure therein.

In view of the above factors characteristic of underwater masks and goggles, it is an object of the present invention to provide goggles affording not only the full range of side vision in addition to distortion-free front vision, but also affording a degree of rear or back vision.

A further object of the invention is to provide underwater goggles so constructed that the nose of the wearer is protected from water, and so constructed that the wearer can exhale into the goggles to equalize pressures therein and prevent excessively hard pressing of the goggles into the face.

These and other objects and advantages of the invention will be more fully set forth in the following specification and claims, considered in connection with the attached drawing to which they relate.

In the drawing:

Figure 1 is a perspective view illustrating a pair of underwater goggles, constructed in accordance with the present invention, as mounted on a wearer or user;

Figure 2 is a horizontal sectional view of the goggles illustrated in Figure 1, taken along line 2—2 of Figure 1; and Figure 3 is a vertical sectional view on line 3—3 of Figure 1.

Referring to the drawing, the goggles of the invention may be seen to comprise a light transmitting portion 10, and a sealing and nose covering portion 11. Light transmitting portion 10 is formed of a suitable glass or plastic material.

The light transmitting portion 10 is symmetrical about a forward-rear plane which passes through the bridge of the nose of the wearer, being formed with symmetrical sections 13 and 14 which are identical except that they are left and right. Only one such section will be described in detail, namely, left section 13, it being understood that the description applies equally to the other section 14.

Section 13 is generally hemispherical, or a segment of a sphere which approaches hemispherical, and is flattened into a large area planar or flat portion 17 in front of and adjacent the eye of the wearer. The flat portion 17 is generally perpendicular to the axis of vision of the wearer when looking directly ahead, and merges with the curving portion 18 of section 13 through a smooth curve instead of a sharp break.

The rear edge of curving portion 18 may be provided with a flange 22 which is embedded in sealing relation within the sealing and nose covering portion 11. Such rear edge is substantially perpendicular to both the forehead and cheek of the wearer, the latter being possible because flat portion 17 and the rear edge lie generally in planes disposed at an acute angle relative to each other and converging in the region of the bridge of the nose (Figure 2).

The section 13 is generally J or hook-shaped in horizontal section, as shown in Figure 2. The part of edge portion 18 adjacent planar portion 17 is curved about a relatively long radius indicated at 19 in Figure 2. The rear part of edge portion 18, adjacent the cheek and forwardly of the ear, is curved about a shorter radius indicated at 21.

The left and right sections 13 and 14 of the light transmitting portion 10 are preferably intergral with each other, and meet along a curved junction 23 disposed forwardly of the bridge of the nose.

The sealing and nose covering portion 11 of the underwater goggles comprises a continuous lip 26, formed of a suitable elastomeric material such as rubber, and a nose element 27 which is preferably integral with the lip 26. The lip 26 is generally tear-drop shaped, having a relatively thick portion (Figure 2) in which is embedded the flange 22 described above. The thick portion merges into a thin portion, the latter terminating in a relatively sharp edge remote from the flange 22. The sharp edge is adapted to be forced by water pressure against the forehead, cheeks, and upper lip of the wearer, which provides an effective seal preventing leakage of water into the light transmitting portion 10. It will be understood, as illustrated in Figure 3, that in the region of the nose the flange 22 is embedded in the relatively thick edge of the nose element 27, instead of in the lip 26.

A suitable mounting strap, indicated at 28, is connected to lip 26 at opposite ends of the light transmitting portion 10. This strap, the ends of which are adjustably mounted on ears 29, need only be sufficiently tight to engage all portions of lip 26 with the face of the wearer, since water pressure provides an additional sealing action after the goggles are immersed.

In the operation of the goggles, after mounting on the wearer by means of the strap 28, the forward or front vision is distortion-free since the large area portions 17 are planar and perpendicular to the axis of vision as previously described. Furthermore, there is relatively little distortion at the junction between each flat portion 17 and the connected edge portion 18, this being due to the fact that these portions meet in a relatively smooth curve instead of at a sharp break. Because of the backward or J-shaped curvature of each edge portion 18 adjacent to the cheek, the wearer not only has unimpeded side vision but also has a certain amount of rear or back vision. The latter is due to the refraction of light rays by the rearmost portions of edges 18 due to the curvature thereof about radius 21 as set forth above. Such side and back vision, of course, is not perfectly clear, and is out of focus as is all side vision. However, such vision is extremely important since it permits the skin diver to discern motion and strange objects, of an interesting or dangerous nature, so that he may turn his head and look directly at such objects in order to obtain a distortion-free view thereof.

It is emphasized that the refraction effects are very different below water than above water, and that goggles suitable for use in air are normally unsuitable for use under water and vice versa. Thus, with the present underwater goggles, the light rays pass to the eyes first through water, then through the plastic or glass of transparent portion 10, and then through air between such portion and the eye. Refraction effects thus produced are different than in the case where light rays pass first through the air, then through a lens, and then through air to the eye.

When the skin diver descends to substantial depths, the water presses against the transparent portion 10 and against the lip 26 and effects tight pressing thereof against the forehead, cheeks and upper lip of the wearer. This, as above described, has a desirable sealing action, but at substantial depths it becomes excessive and uncomfortable. When this occurs, the diver merely exhales a slight amount of air through his nostrils and into the nose element 27, which is in communication with the interior of transparent portion 10. The pressure in transparent portion 10 is thus increased to partially balance the water pressure and relieve the pressing of the lip 26 into the face of the wearer.

Various embodiments of the present invention, in addition to what has been illustrated and described in detail, may be employed without departing from the scope of the accompanying claims.

I claim:

1. Underwater goggles adapted to be employed in skin diving to afford substantially distortion-free side vision as well as front vision, and which are adapted to be worn comfortably without biting into the face of the wearer immediately adjacent the eyeballs; which comprise two separate relatively large transparent elements having center portions adapted to be disposed immediately in front of the eyes of the wearer when the goggles are positioned on the wearer, said transparent elements also having smoothly rounded side portions which curve into proximity with the forehead and cheeks of the wearer when the goggles are positioned thereon, said side portions being fully transparent to permit substantially distortion-free side vision and being sufficiently large in size to be spaced substantial distances away from the eyeballs of the wearer when the goggles are positioned thereon to thereby prevent the goggles from biting into the wearer adjacent the eyeballs, said transparent side portions of said transparent elements merging smoothly with the transparent center portions thereof to minimize distortion at the junction of the center portions and side portions, means to connect said transparent elements together, sealing means provided on said side portions to effect water-tight seals against the forehead and cheeks of the wearer when the goggles are positioned thereon to prevent entrance of water into said transparent elements, and means to mount said transparent elements and sealing means in sealing relation on the head of the wearer.

2. Underwater goggles adapted to be employed in skin diving to afford substantially distortion-free side vision as well as front vision, and which are adapted to be worn comfortably without biting into the face of the wearer immediately adjacent the eyeballs; which comprise left and right transparent elements which are connected to each other and are symmetrical about a central plane, said central plane being the one which is coincident, when the goggles are in mounted condition on the wearer, with a reference plane parallel to and midway between the axes of vision of the wearer when the wearer is looking directly ahead, said reference plane intersecting the bridge of the nose and point of the chin of the wearer, each of said transparent elements being shaped generally as a segment of a sphere approaching hemispherical and being fully transparent to afford substantially distortion-free side vision as well as front vision, each of said transparent elements being substantially larger than the size of the eye recess of a normal adult human whereby the edge portions of said transparent elements are disposed in proximate relationship to the forehead and cheeks of a wearer when the goggles are positioned thereon, and means to effect substantially water-tight seals between said edge portions and said forehead and cheeks of the wearer when the goggles are positioned thereon.

3. The invention as claimed in claim 2, in which a portion of the spherical segment comprising each of said transparent elements is flattened, each flattened portion being so located relative to said sealing means as to be directly in front of an eye of the wearer when the goggles are mounted thereon.

4. Skin diving goggles adapted to afford both front vision and a large measure of side vision and to be worn comfortably by a wearer even when the skin diver is at substantial depths below the surface of the water, which comprises left and right generally hemispherical elements which are sealingly connected to each other and are symmetrical about a central plane, each of said elements being adapted to be disposed in front of an eye of the wearer when the goggles are in mounted position thereon and being transparent throughout to afford both front vision and side vision, each of said elements being much larger than the eye recess of an adult human whereby the edge of each hemispherical element is positioned adjacent the forehead and cheeks of the wearer and spaced away from the eyeball when the goggles are in mounted condition on the wearer, each of said elements having a flattened portion which merges smoothly with the remaining curved portion and which is adapted to be disposed immediately in front of an eye of the wearer when the goggles are in mounted position thereon to thereby afford improved front vision, elastomeric sealing means mounted around the edge of each of said elements and adapted to sealingly engage the forehead and cheeks of the wearer when the goggles are in mounted position thereon, and means to mount said elements and said sealing means on the wearer.

5. The invention as claimed in claim 4, in which said flattened portions of said elements lie generally in a single plane perpendicular to the axes of vision of the wearer when the wearer is looking directly ahead and when the goggles are in mounted condition on the wearer, and in which the edges of said elements lie in separate planes disposed at acute angles to said first-mentioned plane, said last-mentioned planes converging in the region of the bridge of the pose of the wearer when the goggles are in mounted position thereon.

6. The invention as claimed in claim 4, in which nose-covering means are provided for mounting over the nose of the wearer in water-sealing relationship, said nose-covering means communicating freely with the interiors of said hemispherical elements to permit the skin diver to equalize pressures within said hemispherical elements by exhaling into said nose-covering means.

References Cited in the file of this patent

UNITED STATES PATENTS

| | | |
|---|---|---|
| D. 143,948 | Browne | Feb. 26, 1946 |
| 916,109 | Cook | Mar. 23, 1909 |
| 2,393,533 | Heinz | Jan. 22, 1946 |
| 2,568,316 | Brown | Sept. 18, 1951 |
| 2,581,007 | Douglas et al. | Jan. 1, 1952 |
| 2,589,575 | Richardson et al. | Mar. 18, 1952 |
| 2,709,256 | Baratelli | May 31, 1955 |